US011988243B2

(12) United States Patent
Gintner

(10) Patent No.: US 11,988,243 B2
(45) Date of Patent: May 21, 2024

(54) MASSAGE GUN MOUNTING DEVICE

(71) Applicant: Drew David Gintner, Chippewa Falls, WI (US)

(72) Inventor: Drew David Gintner, Chippewa Falls, WI (US)

(73) Assignee: Mount-UP LLC, Chippewa Falls, WI (US)

( * ) Notice: Subject to any disclaimer, the term of this patent is extended or adjusted under 35 U.S.C. 154(b) by 44 days.

(21) Appl. No.: 17/686,024

(22) Filed: Mar. 3, 2022

(65) Prior Publication Data

US 2023/0279897 A1 Sep. 7, 2023

(51) Int. Cl.
*F16B 47/00* (2006.01)
*A61H 23/02* (2006.01)

(52) U.S. Cl.
CPC ............. *F16B 47/00* (2013.01); *A61H 23/02* (2013.01)

(58) Field of Classification Search
CPC ........ F16B 47/00; A61H 23/02; A61H 9/0057
See application file for complete search history.

(56) References Cited

U.S. PATENT DOCUMENTS

| 2,815,919 | A | * | 12/1957 | Pribil | ...................... | F16B 47/00 |
| | | | | | | 248/363 |
| 2,954,909 | A | * | 10/1960 | Miller | ..................... | A01K 97/10 |
| | | | | | | 224/907 |
| 6,089,517 | A | * | 7/2000 | Johnstone | ................ | A63H 3/50 |
| | | | | | | 248/205.5 |
| 6,382,574 | B1 | | 5/2002 | Pando | | |
| 6,502,794 | B1 | * | 1/2003 | Ting | ......................... | F16B 47/00 |
| | | | | | | 248/205.5 |
| 6,637,707 | B1 | * | 10/2003 | Gates | ........................ | A47F 5/08 |
| | | | | | | 248/222.12 |
| 10,542,738 | B2 | * | 1/2020 | Moses | .................... | A47F 7/0035 |

(Continued)

FOREIGN PATENT DOCUMENTS

CN 2779138 Y 5/2006

OTHER PUBLICATIONS

Vertiball™ Massager: The World's First Mountable Muscle Massager, Retrieved from Internet, Retrieved on Dec. 22, 2021 <URL: https://shop.mashable.com/sales/vertiball-massager-the-world-s-first-mountable-muscle-massager?utm_term=scsf-390331&utm_content=a0x1P000004Xo2oQAC&utm_xe2e=01jzISfuwW7kDvSFrGy7RS5&utm_source=mashable.com&utm_medium=referral&utm_campaign=vertiball-massager-the-world-s-first-mountable-muscle-massager&scsonar=1>.

(Continued)

*Primary Examiner* — Ko H Chan
(74) *Attorney, Agent, or Firm* — Simpson & Simpson, PLLC

(57) ABSTRACT

A massage gun mounting device suitable for mounting a massage gun style device to a wall or flat surface is presented. The massage gun mounting device contains a mounting bracket, and a device receiver. The mounting bracket contains a mounting element and a receiving platform. The device receiver contains a connection element, a plurality of connectors, and a receiving cavity. The mounting element and the receiving platform are positioned terminally opposite to each other along the device receiver. The connection element and the receiving cavity are positioned terminally opposite to each other along the device receiver. The connection element is connected adjacent to the receiving platform through a plurality of fastening elements. The plurality of connectors is distributed about the device receiver.

20 Claims, 5 Drawing Sheets

(56) References Cited

U.S. PATENT DOCUMENTS

| | | | |
|---|---|---|---|
| 2003/0160060 A1* | 8/2003 | Hornblad | A47F 5/08 221/256 |
| 2007/0152120 A1* | 7/2007 | Hostetler | B63C 11/22 248/206.3 |
| 2007/0221801 A1* | 9/2007 | Jensen | F16B 47/00 248/206.2 |
| 2012/0043439 A1* | 2/2012 | Liao | F16M 11/041 248/205.8 |
| 2015/0306622 A1* | 10/2015 | Ashworth | F16M 13/022 248/205.8 |
| 2016/0025264 A1* | 1/2016 | Casagrande | F16M 13/00 248/205.9 |
| 2016/0271010 A1* | 9/2016 | Brader | A61H 31/00 |

OTHER PUBLICATIONS

Mantis Mount, Retrieved from Internet, Retrieved on Dec. 22, 2021 <URL: https://www.mantismount.com/shop/p/mantismount>.

* cited by examiner

MASSAGE GUN MOUNTING DEVICE

FIELD OF THE INVENTION

The present invention relates to mounting devices. More specifically, the present invention relates to mounting devices that secures a massage gun along a flat surface.

BACKGROUND OF THE INVENTION

With the improvement of the quality of life, exercise is a must-have for most people, and it will often produce soreness. Whether it is a professional athlete or a general leisure enthusiast, you must have experienced muscle soreness. Massage guns and fascia guns are good tools to help stretch and recover after exercise. Most of the existing massage guns are equipped with a driving device and a massage device. The motor installed in the massage gun is used to drive the cam or eccentric to drive the connecting rod to convert the circular rotation into the linear reciprocating motion of the massage head. The muscles are stimulated by high-frequency vibration. Muscle building, various receptors in the joint capsule, using a massage gun to massage the human body can reduce myogenic pain, increase the pain threshold, and reduce the accumulation of lactic acid. After exercise, using a fascia gun to massage the human muscles can relieve soreness, shortening muscle recovery duration post-exercise. Conventionally, these massage guns are oftentimes held by the user, limiting the degree the user can utilize the massage gun on their backs or any other hard to reach areas. Therefore, it is an objective of the present invention to provide a means to secure the massage gun along a wall or a flat surface. The present invention aims to solve this problem.

The present invention allows the user to mount and secure the massage gun along a wall or a flat surface. This allows the user to administer therapeutic relief along the user's back or any other hard to reach area not accessible by the user's hands. In further embodiments, the present invention allows the user to mount the massage gun to any securement member such as but not limited to exercise machine frames, support poles, furniture, or any other suitable securement member.

SUMMARY OF THE INVENTION

The present invention is a massage gun mounting device suitable for mounting a massage gun style device to a flat surface. The massage gun mounting device comprises a mounting bracket, and a device receiver. The mounting bracket comprises a mounting element and a receiving platform. The device receiver comprises a connection element, a plurality of connectors, and a receiving cavity. The mounting element and the receiving platform are positioned terminally opposite to each other along the device receiver. The connection element and the receiving cavity are positioned terminally opposite to each other along the device receiver. The connection element is connected adjacent to the receiving platform through a plurality of fastening elements. The plurality of connectors is distributed about the device receiver.

DETAIL DESCRIPTIONS OF THE INVENTION

Figure 1:
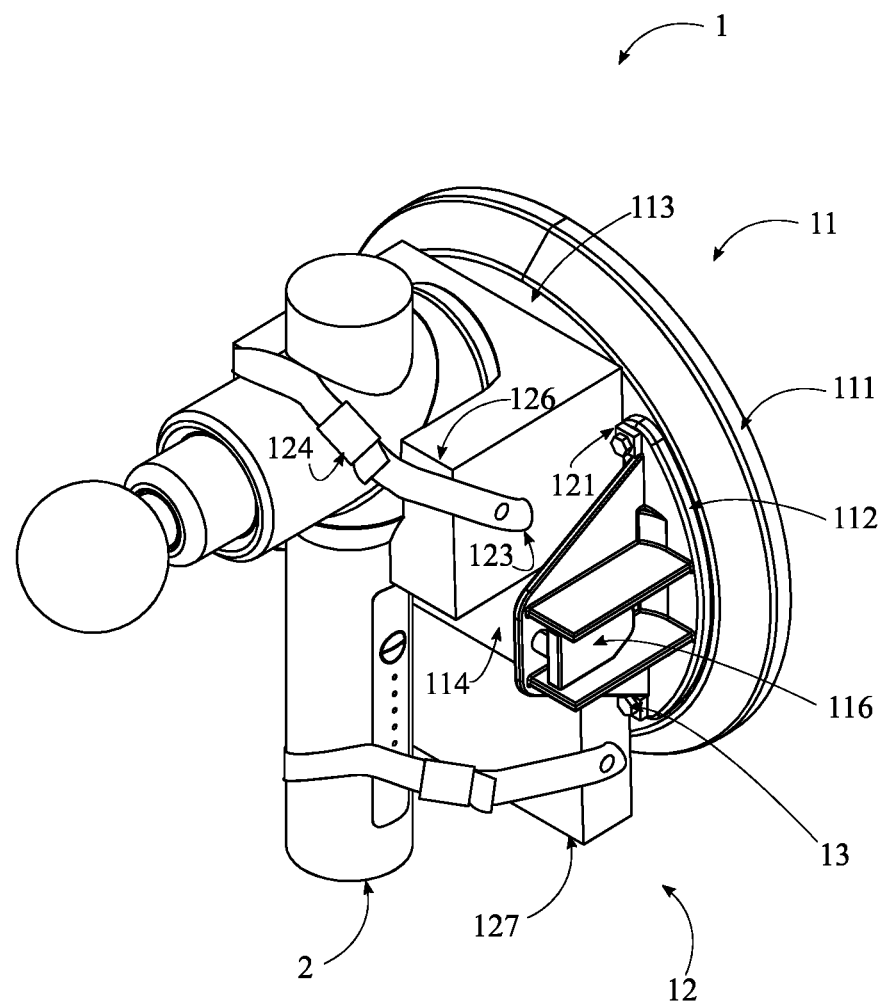
FIG. 1 is a top perspective view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-4, the present invention is a massage gun mounting device 1 suitable for mounting a massage gun style device 2 to a flat surface. The massage gun mounting device 1 comprises a mounting bracket 11, and a device receiver 12. The mounting bracket 11 comprises a mounting element 111 and a receiving platform 112. In reference to FIGS. 1-4, the device receiver 12 comprises a connection element 121, a plurality of connectors 123, and a receiving cavity 125. The mounting element 111 and the receiving platform 112 are positioned terminally opposite to each other along the mounting bracket 11. The connection element 121 and the receiving cavity 125 are positioned terminally opposite to each other along the device receiver 12. The connection element 121 is connected adjacent to the receiving platform 112 through a plurality of fastening elements 13. The plurality of connectors 123 is distributed about the device receiver 12. In the preferred embodiment, the massage gun mounting device 1 is mounted along a wall or any other suitable flat surface. The massage gun style device 2 is then inserted along the receiving cavity 125 and fastened down using the plurality of connectors 123. Once mounted, the massage gun style device 2 is positioned along the wall or flat surface such that a user can administer massage therapy along the bodily area of interest. In the preferred embodiment, the mounting bracket 11 takes the form of any suitable mounting bracket 11 that allows the massage gun mounting device 1 to mount along the wall or flat surface. In the preferred embodiment, the mounting bracket 11 is made out of any suitable, durable, lightweight, and economic material such as but not limited to aluminum, fiberglass, polymer or any other suitable material. In the preferred embodiment, the device receiver 12 takes the form of any suitable receiver implement that hoists the massage gun style device 2 along the mounting bracket 11. In the preferred embodiment, the device receiver 12 is made out of any suitable, durable, lightweight, and economic material such as but not limited to aluminum, polymer, fiberglass, or any other suitable material.

In the preferred embodiment, the mounting element 111 takes the form of any suitable mounting implement that allows the mounting bracket 11 to adhere or connect along a flat surface such as but not limited to suction cups, adhesive pads, lag bolt fasteners, or any other suitable mounting implement. In the preferred embodiment, the receiving platform 112 takes the form of the mounting bracket 11 frame that supports and secures the device receiver 12 along the mounting bracket 11. In the preferred embodiment, the receiving platform 112 is made out of any suitable material such as but not limited to polymer, aluminum, fiberglass, or any other suitable material. In the preferred embodiment, the connection element 121 takes the form of any suitable connection implement that secures and connects the device receiver 12 to the receiving platform 112. In the preferred embodiment, the connection element 121 is a fastener secured connection frame made out of any suitable material such as but not limited to polymer, aluminum, fiberglass, or any other suitable material. In the preferred embodiment, the plurality of connectors 123 takes the form of connection implements that secures the massage gun style device 2 to the receiving cavity 125. In the preferred embodiment, the plurality of connectors 123 takes the form of any suitable connector implement such as but not limited to fastening straps, clamps, or any other suitable connector implement. In the preferred embodiment, the receiving cavity 125 takes the form of a receiving channel that positions and secures the massage gun style device 2 along the device receiver 12. In the preferred embodiment, the receiving cavity 125 takes the form of any suitable shape such that the receiving cavity 125 accommodates any type of massage gun style device 2.

In reference to FIGS. 1-4, the plurality of connectors 123 is a plurality of connection straps. The plurality of connection straps is distributed about the device receiver 12. The mounting element 111 is a suction cup. The plurality of connection straps comprises an adjustment element 124. The adjustment element 124 is operatively engaged to the plurality of connection straps, where the adjustment element 124 is configured to adjust the plurality of connection straps in length. In the preferred embodiment, the adjustment element 124 takes the form of a taut and buckle style adjustment element 124, where the adjustment element 124 is configured to tighten along the massage gun style device 2 such that the massage gun style device 2 is anchored along the receiving cavity 125.

In reference to FIGS. 1-4, the mounting element 111 is a suction cup. In various embodiments, the mounting element 111 may take the form of any other suitable mounting element to allow the mounting bracket 11 to secure along to any securement member such as but not limited to securement straps, securement screws, quick disconnect connection implements, or any other suitable mounting implement. The receiving platform 112 comprises a receiver base 113 and a suction pump 114. The receiver base 113 is connected adjacent to the suction cup. The suction pump 114 is connected adjacent to the receiver base 113, opposite to the suction cup. The suction pump 114 is in fluid communication with the suction cup. The suction pump 114 comprises a pump actuator 115 and a valve release 116. The pump actuator 115 and the valve release 116 are in fluid communication with the suction pump 114. In the preferred embodiment, the receiver base 113 facilitates the connection of the suction cup to the receiving platform 112 and the device receiver 12. In the preferred embodiment, the receiver base 113 takes the form of any suitable material such as but not limited to aluminum, polymer, fiberglass, or any other suitable material. In the preferred embodiment of the present invention, the suction pump 114 takes the form of a manual pump that provides suction along the suction cup such that the suction cup can mount along the wall or any other suitable flat surface. In the preferred embodiment, the pump actuator 115 takes the form of a button style compressive unit that allows the user to pump and actuate the suction pump 114 to generate suction along the suction cup. In the preferred embodiment, the valve release 116 takes the form of a user actuated pressure release that allows the user to release the suction along the suction cup in order to remove the suction cup along the wall or flat surface.

In reference to FIGS. 1-4, the device receiver 12 further comprises a receiving block 126. The receiving block 126 is connected adjacent to the receiving platform 112. Receiving block 126 includes front surface 132, upper surface 133, lower surface 134, and rear surface 135. The receiving cavity 125 traverses into the receiving block 126. The device receiver 12 further comprises a fastening block 127. The fastening block 127 is connected adjacent to the receiving block 126. The fastening block 127 is connected between the mounting element 111 and the receiving platform 112. In the preferred embodiment, the receiving block 126 accommodates the receiving cavity 125 and provides structural and positional support to the massage gun style device 2. In the preferred embodiment, the fastening block 127 serves as a connection implement along the mounting element 111 and the receiving platform 112 such that the device receiver 12 does not buckle or tip out of the mounting bracket 11.

Figure 4:
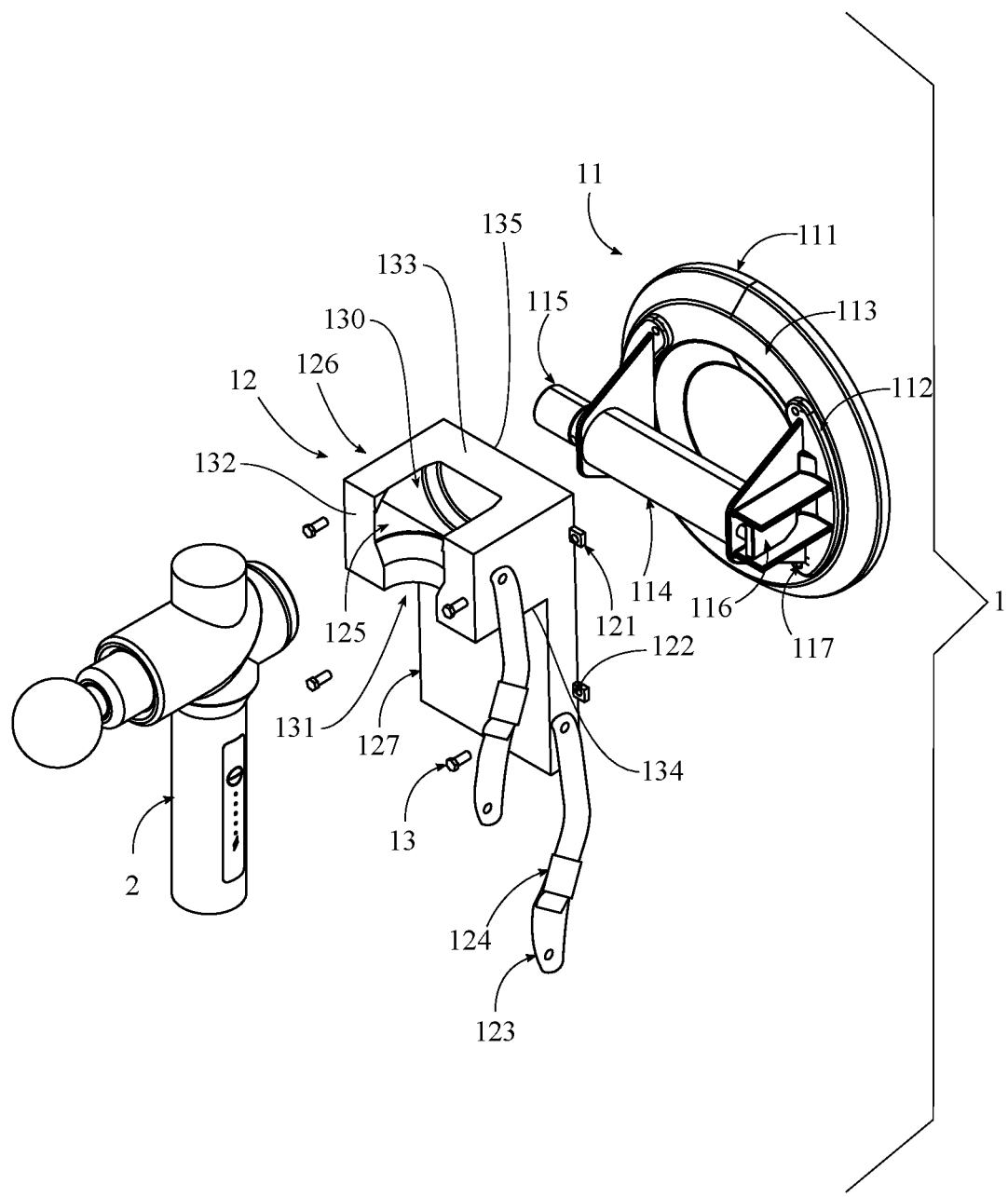
FIG. 4 is an exploded view of the present invention.

As shown in FIG. 4, device receiver 12 includes receiving block 126 and fastening block 127. Receiving block includes receiving cavity 125 therein. As shown, receiving cavity 125 is formed by upper portion 130 and lower portion 131 thereof. Upper portion 130 of receiving cavity 125 is proximate upper surface 133 and has an opening substantially arranged within upper surface 133 and front surface 132. Lower portion 131 of receiving cavity 125 is proximate lower surface 134 and has an opening substantially arranged within lower surface 134 and front surface 132—as generally illustrated in FIG. 4.

Figure 2:
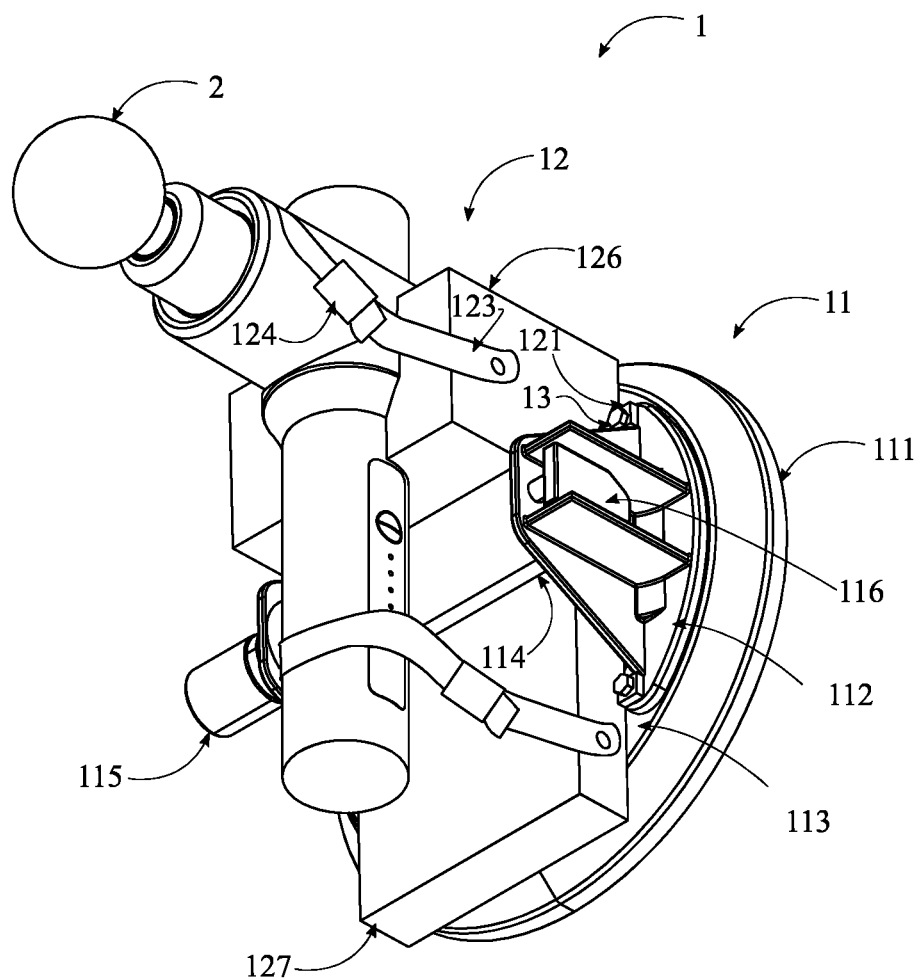
FIG. 2 is a bottom perspective view of the present invention.
Figure 3:
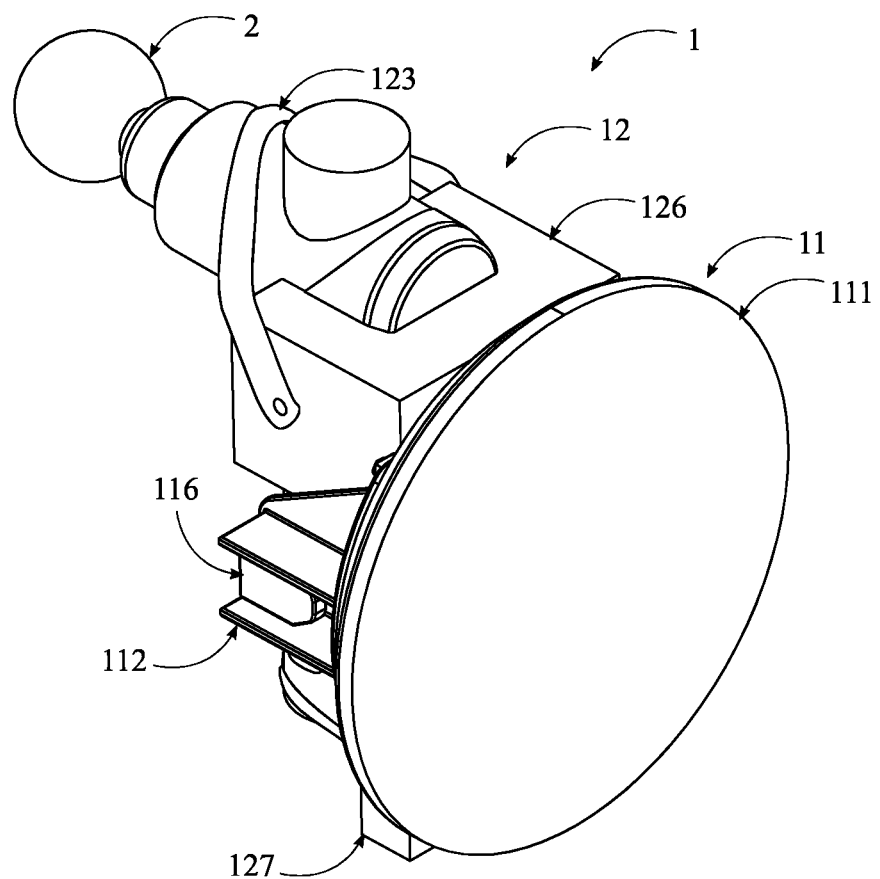
FIG. 3 is a rear perspective view of the present invention.
Figure 5:
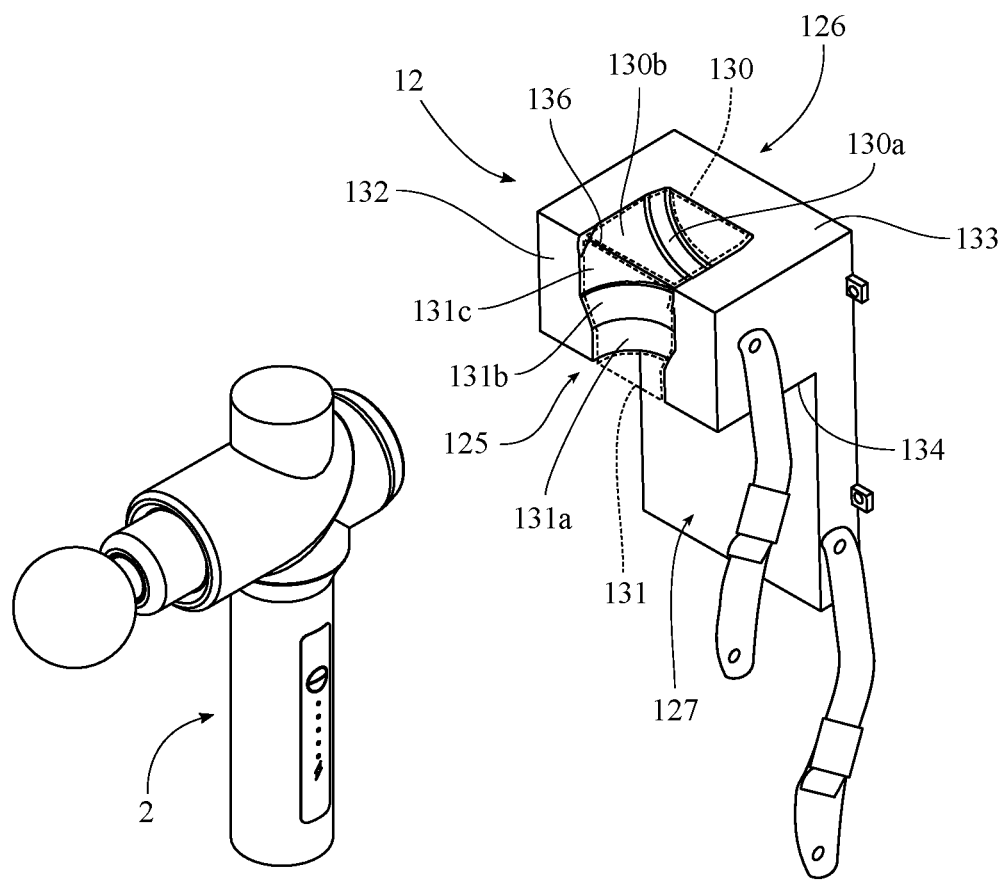
FIG. 5 is an enlarged exploded view of massage gun 2 and device receiver 12.

As generally illustrated in FIG. 5, upper portion 130 and lower portion 131 of receiving cavity 125 are substantially bifurcated along edge 136. In some arrangements, upper portion 130 includes first recessed surface 130a disposed distally in relation to front surface 132 and second recessed surface 130b disposed proximate to front surface 132, whereas lower portion 131 includes first recessed surface 131a disposed proximate lower surface 134, third recessed surface 131a disposed proximate upper surface 133, and second recessed surface 131b disposed between first recessed surface 131a and third recessed surface 131c. As shown, recessed surfaces 130a and 130b of upper portion 130 are substantially perpendicular to recessed surfaces 131a-131c of lower portion 131. As further illustrated, at least one of recessed surfaces 130a-130b and 131a-131c has a concave curvature in related to one of upper surface 133 and front surface 132. In some embodiments, first recessed surface 130a may have a diameter less than a diameter of second recessed surface 130b. In further embodiments, first recessed surface 131a may have a diameter less than a diameter of second recessed surface 131b, and the diameter of second recessed surface 131b may be less than a diameter of third recessed surface 131c. The aforementioned arrangements of upper portion 130 and lower portion 131 of receiving cavity 125 allow massage gun style device 2 to be substantially abutting the respective recessed surfaces (130a-130b and 131a-131c) of the upper and lower portions of receiving cavity 125, as depicted in FIGS. 1-3.

In reference to FIGS. 1-4, the connection element 121 comprises a plurality of fastening apertures 122. The receiving platform 112 comprises a plurality of mounting apertures 117. The plurality of fastening apertures 122 is distributed about the connection element 121. The plurality of mounting apertures 117 is distributed about the receiving platform 112. The plurality of fastening apertures 122 and the plurality of mounting apertures 117 is aligned and connected to each other through the plurality of fastening elements 13. In the preferred embodiment, the plurality of fastening apertures 122 and the plurality of mounting apertures 117 serves as mounting holes that allows the plurality of fasteners to connect and align the mounting bracket 11 to the device receiver 12. In the preferred embodiment, the plurality of fasteners takes the form of any suitable fastening implement such as but not limited to screw fasteners, bolt fasteners, rivets, or any other suitable fastening implement.

Although the invention has been explained in relation to its preferred embodiment, it is to be understood that many other possible modifications and variations can be made without departing from the spirit and scope of the invention as hereinafter claimed.

What is claimed is:

1. A massage gun mounting device, comprising:
    a mounting bracket having a mounting element comprising a suction cup and a receiving platform extending from said mounting element; and
    a device receiver comprising a receiving block and a fastening block, said receiving block having a front surface, a rear surface, an upper surface, and a lower surface, a receiving cavity arranged within said receiving block, said receiving cavity formed by an upper portion proximate said upper surface and a lower portion proximate said lower surface, said upper portion arrange substantially perpendicular to said lower portion, wherein at least one of said receiving block and said fastening block threadably secure to said receiving platform, wherein said upper portion and said lower portion of said receiving cavity is configured to accept a massage gun at least partially therein.

2. The massage gun mounting device recited in claim 1 further comprising:
    at least one connection strap secured to said receiving block of said device receiver, said at least one connection strap arranged to secure said massage gun at least partial within said receiving cavity.

3. The massage gun mounting device recited in claim 1 further comprising:
    a plurality of connection elements extending from said device receiver, each of said plurality of connection elements having a fastening aperture arranged therein; and,
    a plurality of mounting apertures disposed within said receiving platform, wherein each of said fastening apertures is substantially colinear with each of said mounting apertures, wherein each of said plurality of fasteners is arranged to engage each of said plurality of fastening apertures and each of said plurality of mounting apertures, thereby securing said device receiver to said mounting bracket.

4. The massage gun mounting device recited in claim 1, wherein said receiving platform comprises a receiver base and a suction pump, said suction cup connected to said receiver base, wherein said suction pump is in fluid communication with said suction cup.

5. The massage gun mounting device recited in claim 4, wherein said suction pump comprises a pump actuator and a valve release, said pump actuator and said valve release in fluid communication with said suction cup.

6. The massage gun mounting device recited in claim 2, wherein said at least one pair of connection straps includes an adjustment element, said adjustment element arranged to adjust the length of said at least one connection strap.

7. The massage gun mounting device recited in claim 1, wherein said upper portion of said receiving cavity includes at least one recessed surface therein and said lower portion of said receiving cavity includes at least one recessed surface therein.

8. The massage gun mounting device recited in claim 1, wherein said receiving cavity includes an opening, said opening traversing said upper surface, said lower surface, and said front surface of said receiving block.

9. A massage gun mounting device comprising:
    a mounting bracket including a suction cup extending from a receiver base and a receiving platform fixed to said receiving base opposite of said suction cup, said receiving platform having a plurality of mounting apertures arranged thereon;
    a device receiver formed by a receiving block and a fastening block, said device receiver having a plurality of connection elements extending from said device receiver, each of said plurality of connection elements having a fastening aperture arranged therein, said receiving block further comprising a front surface, a rear surface, an upper surface, and a lower surface, said receiving block having a receiving cavity arranged therein, said receiving cavity formed by an upper portion proximate said upper surface and said front surface and a lower portion proximate said lower surface and said front surface;
    at least one connection strap secured to said receiving block of said device receiver; and,
    a plurality of fasteners, each of said plurality of fasteners operatively arranged to engage one of said plurality of fastening apertures and one of said plurality of mounting apertures, thereby connecting said mounting bracket to said device receiver, wherein said upper portion and said lower portion of said receiving cavity are both configured to accept a massage gun at least partially therein and wherein said at least one connection strap is configured to secure said massage gun at least partial within said upper portion and said lower portion of said receiving cavity.

10. The massage gun mounting device as recited in claim 9 further comprising:
    a suction pump, said suction cup connected to said receiver base, wherein said suction pump is in fluid communication with said suction cup.

11. The massage gun mounting device recited in claim 10, wherein said suction pump comprises a pump actuator and a valve release, said pump actuator and said valve release in fluid communication with said suction cup.

12. The massage gun mounting device recited in claim 9, wherein said receiving cavity includes an opening, said opening traversing said upper surface, said lower surface, and said front surface of said receiving block.

13. The massage gun mounting device recited in claim 9, wherein said upper portion of said receiving cavity includes at least one recessed surface therein and said lower portion of said receiving cavity includes at least one recessed surface therein, wherein said at least one recessed surface of said upper portion is substantially perpendicular to said at least one recessed surface of said lower portion.

14. The massage gun mounting device recited in claim 9, wherein said at least one pair of connection straps includes an adjustment element, said adjustment element arranged to adjust length of said at least one connection strap.

15. The massage gun mounting device recited in claim 14, wherein said at least one connection straps comprises a first end and a second end, said first end engaged to said device receiver on a first side and said second end engaged to said device receiver on a second side.

16. A massage gun mounting device, comprising:
a mounting bracket including a suction cup extending from a receiver base and a receiving platform fixed to said receiving base opposite of said suction cup, said receiving platform having a plurality of mounting apertures arranged thereon, said mounting bracket further including a suction pump connected to said receiving platform, said suction pump in fluid communication with said suction cup, said suction pump comprises a pump actuator and a valve release;
a device receiver formed by a receiving block and a fastening block, said device receiver having a plurality of connection elements extending from said device receiver, each of said plurality of connection elements having a fastening aperture arranged therein, said receiving block further comprising a front surface, a rear surface, an upper surface, and a lower surface, said receiving block having a receiving cavity arranged therein, said receiving cavity formed by an upper portion proximate said upper surface and said front surface and a lower portion proximate said lower surface and said front surface;
at least one connection strap secured to said receiving block of said device receiver, said at least one pair of connection straps includes an adjustment element, said adjustment element arranged to adjust length of said at least one connection strap; and,
a plurality of fasteners, each of said plurality of fasteners operatively arranged to engage one of said plurality of fastening apertures and one of said plurality of mounting apertures, thereby connecting said mounting bracket to said device receiver, wherein said upper portion and said lower portion of said receiving cavity are both configured to accept a massage gun at least partially therein, wherein said at least one connection strap is configured to secure said massage gun at least partial within said upper portion and said lower portion of said receiving cavity, wherein said upper portion of said receiving cavity includes at least one recessed surface therein and said lower portion of said receiving cavity includes at least one recessed surface therein, wherein said at least one recessed surface of said upper portion is substantially perpendicular to said at least one recessed surface of said lower portion.

17. The massage gun mounting device recited in claim 16, wherein said receiving cavity includes an opening, said opening traversing said upper surface, said lower surface, and said front surface of said receiving block, wherein said opening is within both of said upper portion of said receiving cavity and said lower portion of said receiving cavity.

18. The massage gun mounting device recited in claim 16 wherein said at least one connection straps comprises a first end and a second end, said first end engaged to said device receiver on a first side and said second end engaged to said device receiver on a second side.

19. The massage gun device recited in claim 1, wherein said receiving cavity include an opening, said opening formed by at least one of:
a first opening formed by said upper portion of said receiving cavity, said first opening substantially arranged within said upper surface of said receiving block;
a second opening formed by said lower portion of said receiving cavity, said second opening substantially arranged within said front surface of said receiving block; and,
a third opening formed by said lower portion of said receiving cavity, said third opening substantially arranged within said lower surface of said receiving block, wherein said first opening and said second opening are substantially perpendicular.

20. The massage gun device recited in claim 7, wherein said at least one recessed surface of said upper portion has a curvature arranged concavely to said upper surface and said at least one recessed surface of said lower portion has a curvature arranged concavely to said front surface.

* * * * *